(12) United States Patent
Akasaka

(10) Patent No.: US 7,742,224 B1
(45) Date of Patent: Jun. 22, 2010

(54) OPTICAL AMPLIFICATION IN THE 850 NM WINDOW

(75) Inventor: Youichi Akasaka, Foster City, CA (US)

(73) Assignee: Sprint Communications Company, L.P., Overland Park, KS (US)

( * ) Notice: Subject to any disclaimer, the term of this patent is extended or adjusted under 35 U.S.C. 154(b) by 1586 days.

(21) Appl. No.: 11/012,662

(22) Filed: Dec. 15, 2004

(51) Int. Cl.
*H01S 3/00* (2006.01)

(52) U.S. Cl. .................................. 359/341.5; 359/341.1

(58) Field of Classification Search .............. 359/341.5, 359/341.1; 372/6
See application file for complete search history.

(56) References Cited

U.S. PATENT DOCUMENTS

| | | | | |
|---|---|---|---|---|
| 5,366,937 A | * | 11/1994 | Schneider et al. ............. | 501/40 |
| 5,539,758 A | * | 7/1996 | Dennis ........................... | 372/6 |
| 6,501,596 B1 | * | 12/2002 | Inoue et al. .............. | 359/341.5 |
| 6,721,092 B2 | * | 4/2004 | Aozasa et al. ............ | 359/341.5 |
| 7,313,306 B2 | * | 12/2007 | Yamada et al. .............. | 385/123 |
| 2002/0159137 A1 | * | 10/2002 | Aozasa et al. ............ | 359/341.5 |
| 2002/0171916 A1 | * | 11/2002 | Traynor et al. ........... | 359/341.1 |

OTHER PUBLICATIONS

Dye, S. P., "Fully Engineered 800-nm thulium-doped fluoride-fiber amplifier," WD4 9:30 a.m., OFC '95 Technical Digest, p. 110.

* cited by examiner

*Primary Examiner*—Mark Hellner

(57) ABSTRACT

Systems and methods are disclosed for amplifying optical signals in the 850 nm window. In one embodiment, an amplifier system includes a span of Thulium-doped fiber (TDF) and two pump systems. The TDF span receives and transports optical signals in the 850 nm window. A first pump system pumps the TDF span at a wavelength in the range of 1390 nm to 1430 nm, and a second pump system pumps the TDF span at a wavelength in the range of 670 nm to 720 nm. The pumping generates gain in the optical signals in the 850 nm window. In another embodiment, the amplifier system includes a single pump system. The pump system pumps the TDF span at a wavelength in the range of 1390 nm to 1430 nm to generate gain in the 850 nm window.

20 Claims, 6 Drawing Sheets

OPTICAL AMPLIFICATION IN THE 850 NM WINDOW

BACKGROUND OF THE INVENTION

1. Field of the Invention

The invention is related to the field of optical communication networks, and in particular, to systems and methods for amplifying optical signals in the 850 nm window.

2. Statement of the Problem

The evolution of fiber optics has provided multiple communication windows for optical fibers. The initial communication window was the 850 nm window that was first recognized as a low loss window. Network engineers then discovered a 1310 nm window and a 1550 nm window that are lower loss than the 850 nm window. Therefore, network design and network component design in the fiber optics area have been focused on the 1310 nm window and the 1550 nm window.

As optical signals travel over a length of optical fiber, the optical signals experience some degradation due to attenuation along the fiber. After traveling over 10 km or more of fiber, amplifiers are needed to recover the signal strength of the optical signals. The 1550 nm window and the 1310 nm window each have rare-earth doped optical amplifiers that can recover signal strength. For the 1550 nm window, an Er-Doped Fiber Amplifier (EDFA) is used to amplify the optical signals. For the 1310 nm window, a Pr-Doped Fiber Amplifier (PDFA) is used to amplify the optical signals. Unfortunately, there are no suitable rare-earth doped optical amplifiers for the 850 nm window.

An article by S. P. Dye, M. Fake, and T. J. Simmons entitled "Fully engineered 800-nm Thulium-doped fluoride-fiber amplifier" (referred to herein as the Dye article) describes an optical amplifier in the 800 nm range. The amplifier includes a span of Thulium-doped Fluoride fiber and two pump lasers on single wavelength. One of the pump lasers backward pumps the Thulium-doped Fluoride fiber at 780 nm, and the other pump laser forward pumps the Thulium-doped Fluoride fiber at 780 nm. The Dye article does not provide what gain this amplifier configuration actually produces, but does state that the configuration may provide useful amplification levels between 795 nm and 820 nm. The 850 nm window is commonly known to be between 830 nm and 860 nm. Therefore, the configuration in the Dye article does not amplify signals in the 850 nm window, and does not solve the problem of an amplifier for the 850 nm window.

Also, the configuration in the Dye article is optimized to amplify optical signals around 1480 nm, and the amplification of optical signals between 795 nm and 820 nm is a secondary consequence of the dual pumping at 780 nm. Thulium-doped fiber amplifiers (TDFA) are commonly used for gain in the S-band. Gain is also generated in the 800 nm region according to the configuration in the Dye article. The gain at 1480 nm would be between 25 dB and 30 dB, while the gain in the range of 795 nm to 820 nm would only be about 3 dB. This low of a gain in the range of 795 nm and 820 nm would not provide any useful amplification as desired by network engineers.

Thus, a problem remains to provide adequate amplification for the 850 nm window.

Because of the lack of amplifiers, the 850 nm window is used only for short reach applications that are less than about 10 km. The recent development of photonic crystal fibers, which have zero-dispersion wavelength around 850 nm, makes it desirable to solve the problem of amplification in the 850 nm window so that the 850 nm window may be used for other applications, such as long haul applications.

SUMMARY OF THE SOLUTION

The invention helps solve the above problems by providing amplifier systems and methods for amplifying optical signals in the 850 nm window. The invention advantageously allows the 850 nm window to be used for applications other than just short reach applications. The 850 nm window can effectively be used for long haul networks with the new amplification techniques. The 850 nm window can thus provide an alternative to the 1310 nm and 1550 nm windows for data communications.

One embodiment of the invention includes an amplifier system that amplifies optical signals in the 850 nm window using dual pumping. The amplifier system includes a span of Thulium-doped fiber (TDF) and two wavelength pump systems. The TDF span receives and transports optical signals in the 850 nm window. The 850 nm window comprises a range of wavelengths used for communications commonly between 830 nm and 860 nm. As the TDF span transports the optical signals, the first pump system pumps the TDF span at a wavelength in the range of 1390 nm to 1430 nm. Concurrently, the second pump system pumps the TDF span at a wavelength in the range of 670 nm to 720 nm. The pumping by the pump systems generates gain in the optical signals in the 850 nm window. There may be a 10 dB or higher gain in one or more of the wavelengths of the 850 nm window.

Another embodiment of the invention includes an amplifier system that amplifies optical signals in the 850 nm window using single pumping. The amplifier system includes a TDF span and a pump system. The TDF span receives and transports optical signals in the 850 nm window. As the TDF span transports the optical signals, the pump system pumps the TDF span at a wavelength in the range of 1390 nm to 1430 nm. The pumping by the pump system generates gain in the optical signals in the 850 nm window. There may be a 10 dB or higher gain in one or more of the wavelengths of the 850 nm window.

The invention may include other embodiments described below.

DESCRIPTION OF THE DRAWINGS

The same reference number represents the same element on all drawings.

DETAILED DESCRIPTION OF THE INVENTION

FIGS. 1-9 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
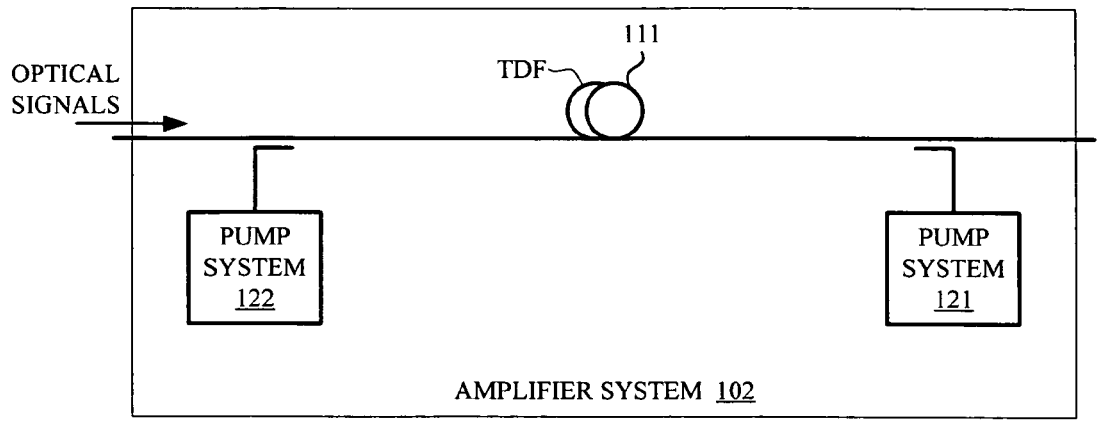
FIG. 1 illustrates an amplifier system configured to amplify optical signals in the 850 nm window in an embodiment of the invention.

FIG. 1 illustrates an amplifier system 102 configured to amplify optical signals in the 850 nm window in an embodiment of the invention. Amplifier system 102 includes a span of Thulium-doped fiber (TDF) 111 and pump systems 121-122. TDF span 111 may be any desired length. TDF span 111 may have a Thulium concentration between 2000 ppm and 6000 ppm, but the concentration may depend on the length of the span. Pump system 121 comprises any laser or light generating system configured to pump TDF span 111 at a wavelength in the range of 1390 nm to 1430 nm. Pump system 122 comprises any laser or light generating system configured to pump TDF span 111 at a wavelength in the range of 670 nm to 720 nm. Pump systems 121-122 may be connected to TDF span 111 through a coupler, a wavelength division multiplexer, or some other device or component. Amplifier system 102 may include other devices, components, or systems not shown in FIG. 1.

In FIG. 1, pump system 121 is shown as backward pumping TDF span 111 and pump system 122 is shown as forward pumping TDF span 111. The invention is not limited to this configuration. In other embodiments, pump system 121 may forward pump TDF span 111 and pump system 122 may backward pump TDF span 111, both pump systems 121-122 may backward pump TDF span 111, or both pump systems 121-122 may forward pump TDF span 111.

Pump system 121 is set to a first power and pump system 122 is set to a second power. A power ratio between the first power and the second power is in the range of 1:1 to 5:1 to produce the desired gain.

Figure 2:
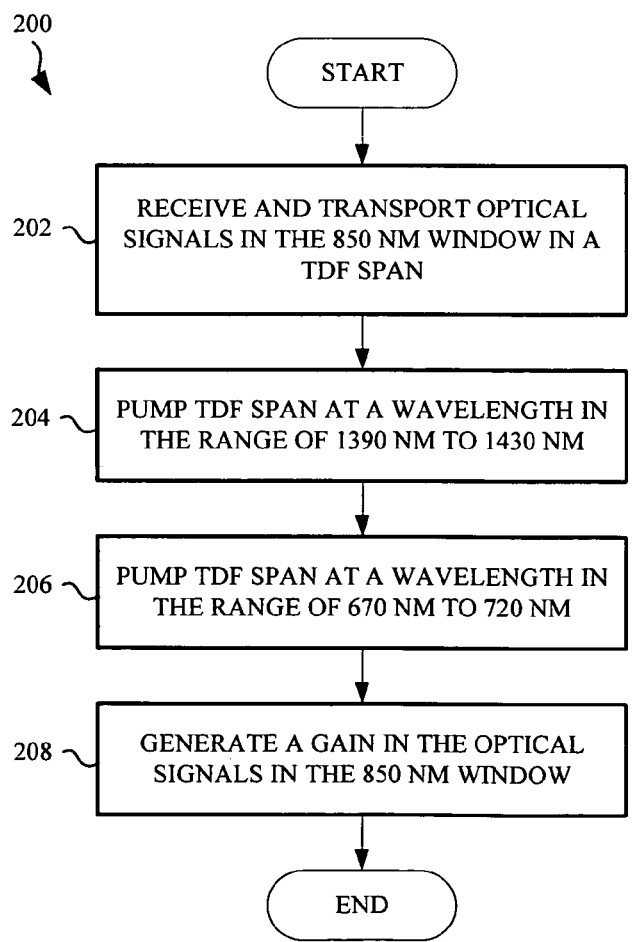
FIG. 2 is a flow chart illustrating a method of operating the amplifier system of FIG. 1 in an embodiment of the invention.

FIG. 2 is a flow chart illustrating a method 200 of operating amplifier system 102 in an embodiment of the invention. For method 200, TDF span 111 receives and transports optical signals in the 850 nm window in step 202. The 850 nm window comprises a range of wavelengths used for communications commonly between 830 nm and 860 nm. As TDF span 111 transports the optical signals, pump system 121 pumps TDF span 111 in step 204. Pump system 121 pumps TDF span 111 at a wavelength in the range of 1390 nm to 1430 nm. The pumping by pump system 121 may comprise forward pumping or backward pumping. Concurrently, pump system 122 pumps TDF span 111 in step 206. Pump system 122 pumps TDF span 111 at a wavelength in the range of 670 nm to 720 nm. The pumping by pump system 122 may comprise forward pumping or backward pumping. The pumping by pump system 121 and pump system 122 generates gain in the optical signals in the 850 nm window in step 208. There may be a 10 dB or higher gain in one or more of the wavelengths of the 850 nm window.

Figure 3:
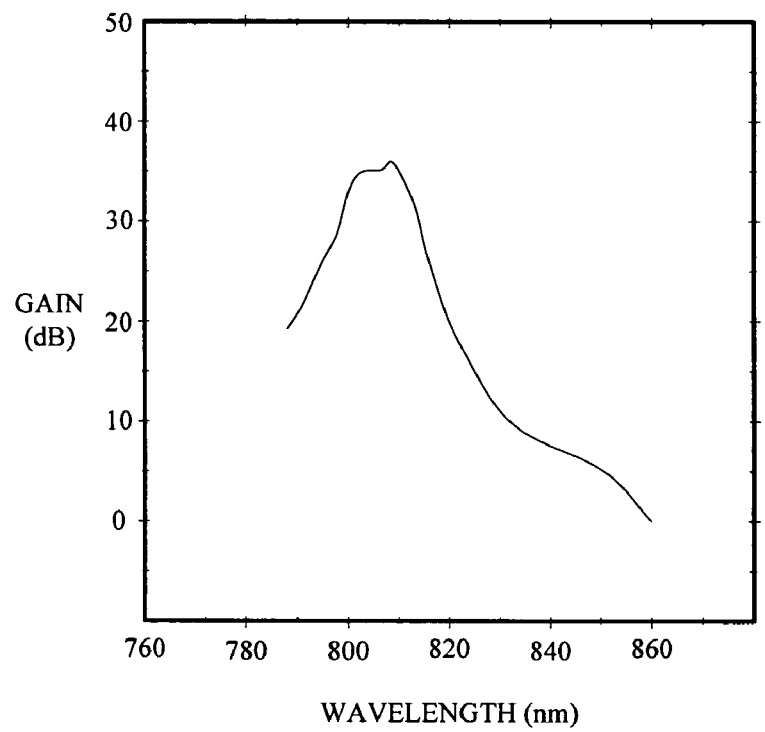
FIG. 3 is a graph illustrating gain generated by the amplifier system of FIG. 1 due to the dual pumping in an embodiment of the invention.

FIG. 3 is a graph illustrating gain generated by amplifier system 102 due to the dual pumping in an embodiment of the invention. There is a 10 dB gain bandwidth of about 40 nm between the 790 nm wavelength and the 830 nm wavelength, with a gain peak at about 810 nm. There is also some gain between the 830 nm wavelength and the 860 nm wavelength. The gain bandwidth of amplifier system 102 may be at least 30 nm, and may extend to 60 nm, 70 nm, 80 nm, or higher. The overall gain can advantageously be used to amplify optical signals in the 850 nm window. The gain illustrated in FIG. 3 is just one embodiment, and the gain may change based on the settings in amplifier system 102.

Figure 4:
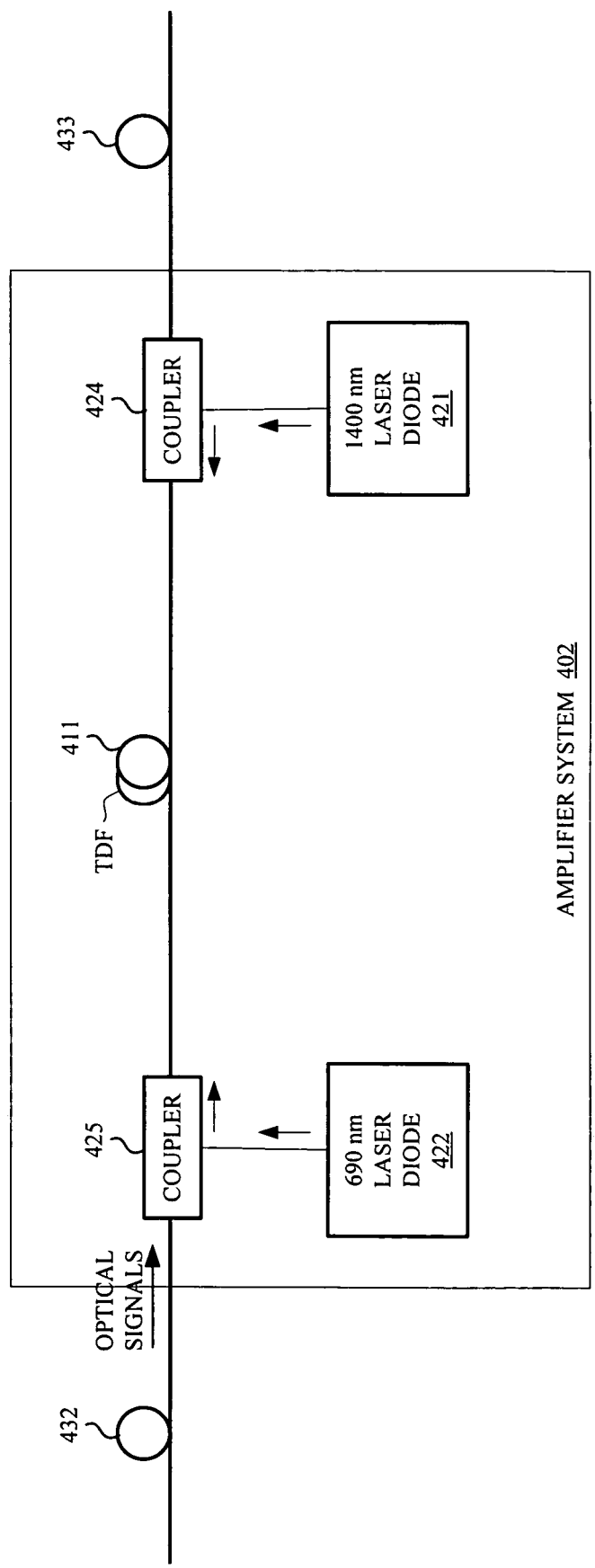
FIG. 4 illustrates a more detailed embodiment of an amplifier system in an embodiment of the invention.

FIG. 4 illustrates a more detailed embodiment of an amplifier system 402 in an embodiment of the invention. Amplifier system 402 dual-wavelength pumps a Thulium-doped fiber (TDF) span similar to amplifier system 102 shown in FIG. 1. Amplifier system 402 includes a TDF span 411, laser diodes 421-422, and couplers 424-425. TDF span 411 has a length of about 60 cm, and has a Thulium concentration between 2000 ppm and 6000 ppm. The concentration of Thulium may depend on the length of TDF span 411. If the dopant concentration is less than about 2000 ppm, then gain efficiency may drop too low. If the dopant concentration is more than about 6000 ppm, then extraction may occur. Laser diode 421 is a 1400 nm laser diode configured to pump TDF span 411. A 1400 nm laser diode 421 is commonly used for Raman pumping. Laser diode 421 is set to about 257 mW. Laser diode 422 is a 690 nm laser diode configured to pump TDF span 411. A 690 nm laser diode is commonly used for DVD applications. Laser diode 422 is set to about 55.8 mW. Laser diode 421 is connected to TDF span 411 through coupler 424. Laser diode 422 is connected to TDF span 411 through coupler 425. Amplifier system 402 may include other devices, components, or systems not shown in FIG. 4.

In FIG. 4, laser diode 421 is shown as backward pumping TDF span 411 and laser diode 422 is shown as forward pumping TDF span 411. In other embodiments, laser diode 421 may forward pump TDF span 411 and laser diode 422 may backward pump TDF span 411, both laser diodes 421-422 may backward pump TDF span 411, or both laser diodes 421-422 may forward pump TDF span 411.

Amplifier system 402 is connected to fiber spans 432-433. One or both of fiber spans 432-433 may comprise a span of photonic crystal fiber. One or both of fiber spans 432-433 may also comprise any other type of fiber having a zero-dispersion wavelength or near zero-dispersion wavelength around 850 nm.

When in operation, TDF span 411 receives and transports optical signals in the 850 nm window. As TDF span 411 transports the optical signals, laser diode 421 pumps TDF span 411 through coupler 424 at a wavelength of 1400 nm. Concurrently, laser diode 422 pumps TDF span 411 through coupler 425 at a wavelength of 690 nm. The pumping by laser diode 421 and laser diode 422 generates gain in the optical signals in the 850 nm window.

Although the Dye article mentioned in the Background discusses an amplifier that uses two pumps to pump a TDF span at a single wavelength, the Dye article does not discuss an amplifier system that pumps a TDF span at the 690 nm and the 1400 nm wavelengths. The Dye article discusses two 780 nm pumps, and network engineers cannot predict a change in gain band based on a change in pumping wavelengths. The discovery of the pumping wavelengths in the ranges discussed herein took extensive experimentation.

First, the molecular model of Tm:ZBLAN glass was constructed by Molecular Dynamics (MD) simulation. The molecular model provides optical properties of the glass, such as absorption cross section, emission spectra, and signal gain. Using the molecular model, the advantages and disadvantages of pumping schemes in terms of gain bandwidth, gain amount, and gain efficiency can be identified.

Figure 5:
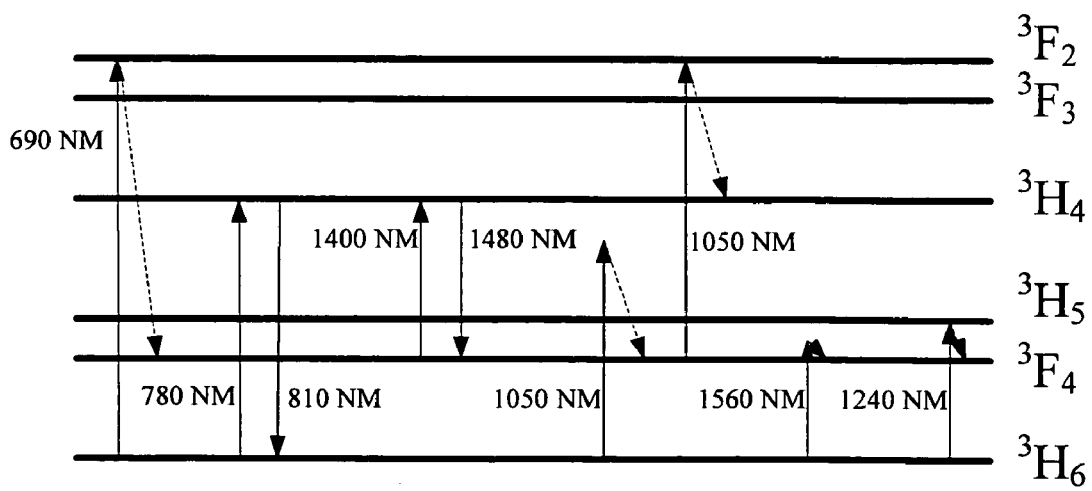
FIG. 5 is an energy diagram of the $Tm^{3+}$ ion illustrating the energy states at particular wavelengths in an embodiment of the invention.

FIG. 5 is an energy diagram of the $Tm^{3+}$ ion illustrating the energy states at particular wavelengths in an embodiment of the invention. For S-band amplification, population inversion between the $^3F_4$ and $^3H_4$ levels is required. On the other hand, amplification at the 800 nm wavelength requires population inversion between the $^3H_6$ and $^3H_4$. There are excitation conditions at 690 nm, 780 nm, 1050 nm, 1240 nm, 1400 nm, 1560 nm, and/or 1670 nm. Based on these excitation conditions, the 690 nm wavelength and the 1400 nm wavelength were selected for dual pumping. Testing an amplifier system that is dual pumping at 690 nm and 1400 nm verified the simulation based on the molecular model.

Figure 6:
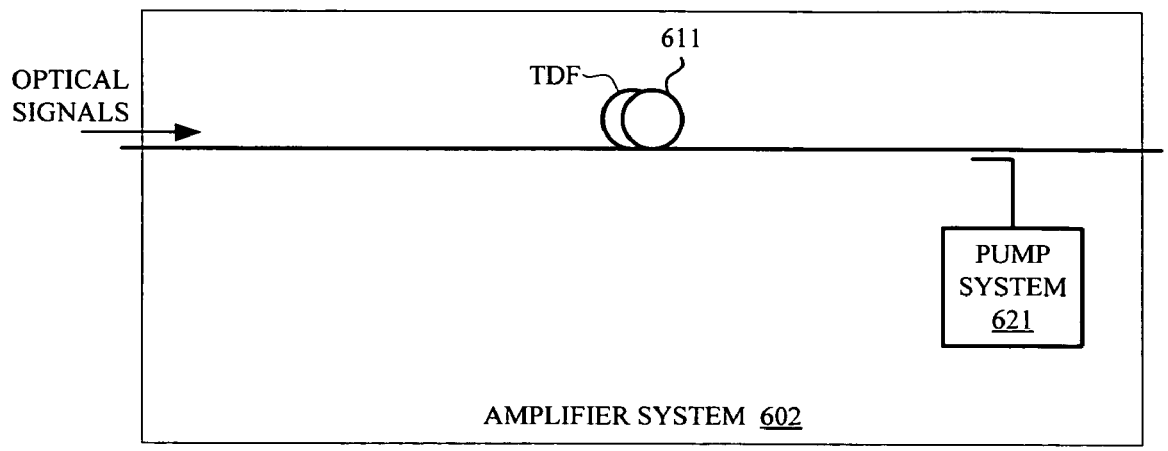
FIG. 6 illustrates another amplifier system configured to amplify optical signals in the 850 nm window using single pumping in an embodiment of the invention.

FIG. 6 illustrates another amplifier system 602 configured to amplify optical signals in the 850 nm window using single pumping in an embodiment of the invention. Amplifier system 602 includes a span of Thulium-doped fiber (TDF) 611 and pump system 621. TDF span 611 may be any desired length. TDF span 611 may have a Thulium concentration of between 2000 ppm and 6000 ppm, but the concentration may depend on the length of the span. Pump system 621 comprises any laser or light generating system configured to pump TDF span 611 at a wavelength in the range of 1390 nm to 1430 nm. Although pump system 621 is shown in FIG. 6 as backward pumping TDF span 611, pump system 621 may alternatively forward pump TDF span 611. Pump system 621 may be connected to TDF span 611 through a coupler, a wavelength division multiplexer, or some other device or component. Amplifier system 602 may include other devices, components, or systems not shown in FIG. 6.

Figure 7:
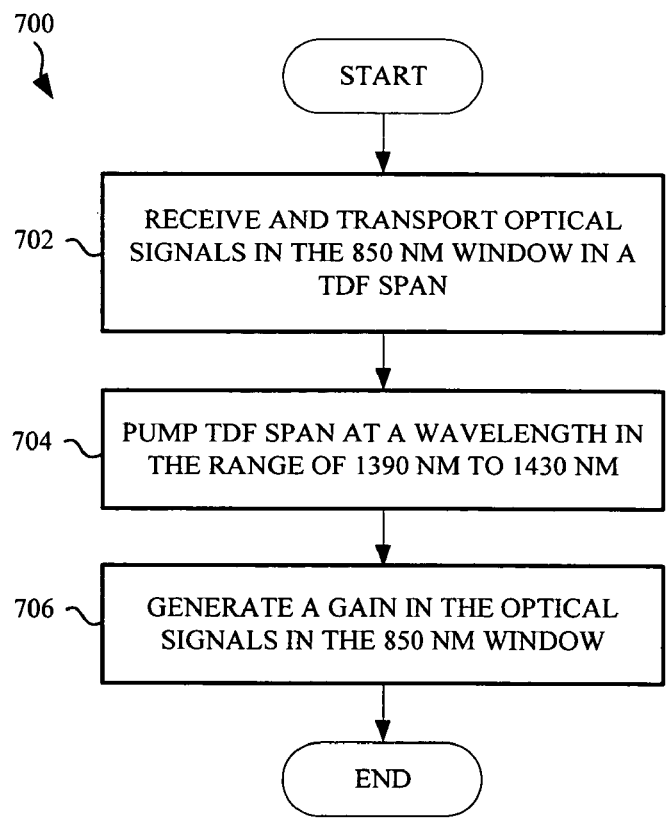
FIG. 7 is a flow chart illustrating a method of operating the amplifier system of FIG. 6 in an embodiment of the invention.

FIG. 7 is a flow chart illustrating a method 700 of operating amplifier system 602 in an embodiment of the invention. For method 700, TDF span 611 receives and transports optical signals in the 850 nm window in step 702. As TDF span 611 transports the optical signals, pump system 621 pumps TDF span 611 in step 704. The pumping may comprise forward pumping or backward pumping. Pump system 621 pumps TDF span 611 at a wavelength in the range of 1390 nm to 1430 nm. The pumping by pump system 621 generates gain in the optical signals in the 850 nm window in step 706. There may be a 10 dB or higher gain in one or more of the wavelengths of the 850 nm window.

Figure 8:
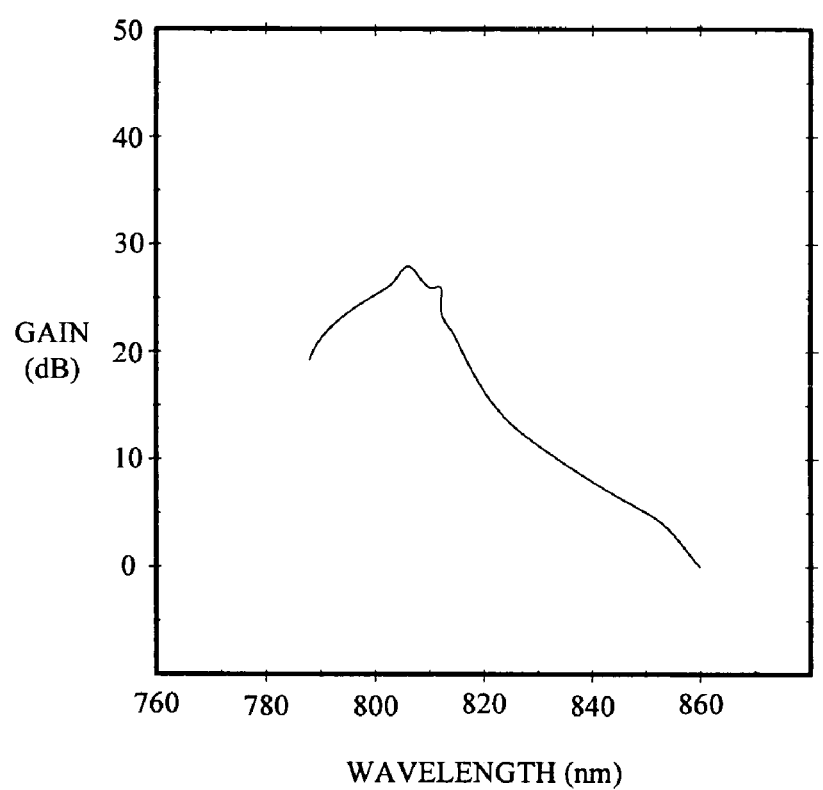
FIG. 8 is a graph illustrating gain generated by the amplifier system of FIG. 6 due to single pumping in an embodiment of the invention.

FIG. 8 is a graph illustrating gain generated by amplifier system 602 due to the single pumping in an embodiment of the invention. There is a 10 dB gain bandwidth of about 40 nm between the 790 nm wavelength and the 830 nm wavelength, with a gain peak at about 810 nm. There is also some gain between the 830 nm wavelength and the 860 nm wavelength. The gain bandwidth of amplifier system 602 may be at least 30 nm, and may extend to 60 nm, 70 nm, 80 nm, or higher. The overall gain can advantageously be used to amplify optical signals in the 850 nm window. The gain illustrated in FIG. 8 is just one embodiment, and the gain may change based on the settings in amplifier system 602.

Figure 9:
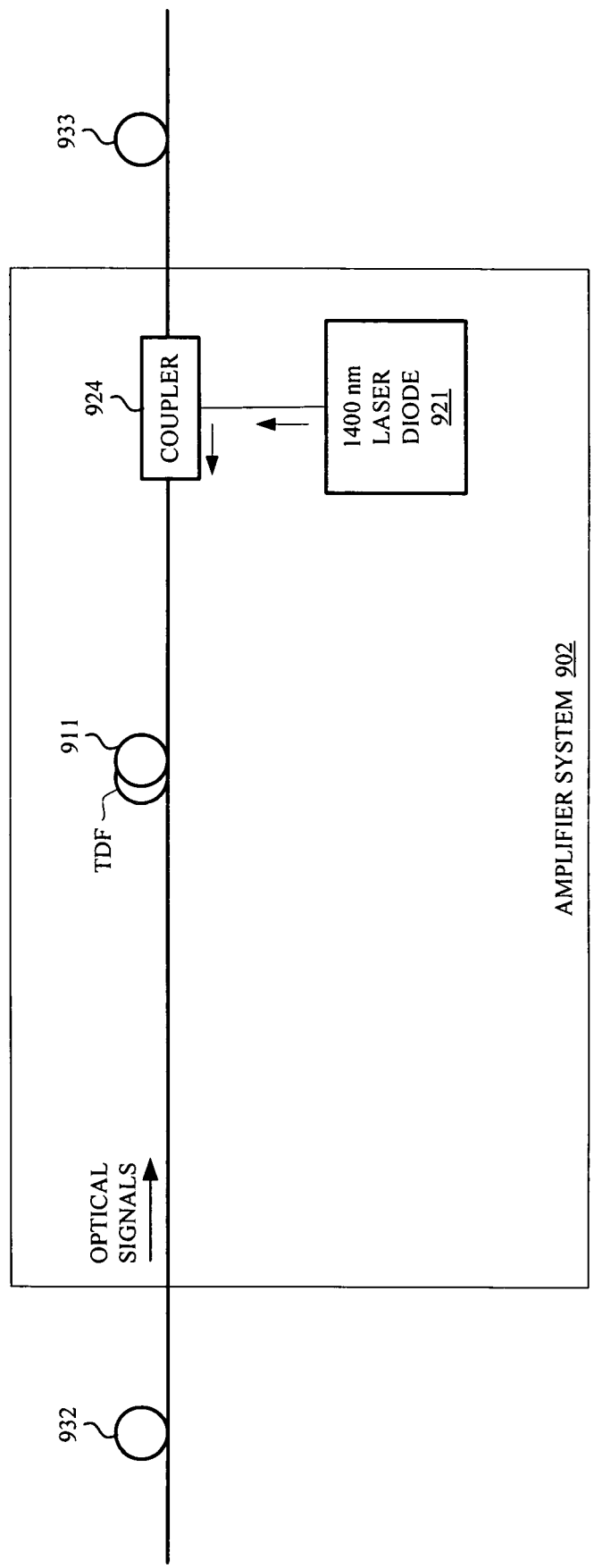
FIG. 9 illustrates a more detailed embodiment of an amplifier system in an embodiment of the invention.

FIG. 9 illustrates a more detailed embodiment of an amplifier system 902 in an embodiment of the invention. Amplifier system 902 single pumps a Thulium-doped fiber (TDF) span similar to amplifier system 602 shown in FIG. 6. Amplifier system 902 includes a TDF span 911, a laser diode 921, and a coupler 924. TDF span 911 has a length of about 60 cm, and has a Thulium concentration of between 2000 ppm and 6000 ppm. Laser diode 921 is a 1400 nm laser diode configured to pump TDF span 911. Laser diode 921 is set to about 257 mW. Although laser diode 921 is shown in FIG. 9 as backward pumping TDF span 911, laser diode 921 may alternatively forward pump TDF span 911. Laser diode 921 is connected to TDF span 911 through coupler 924. Amplifier system 902 may include other devices, components, or systems not shown in FIG. 9.

Amplifier system 902 is connected to fiber spans 932-933. One or both of fiber spans 932-933 may comprise a span of photonic crystal fiber. One or both of fiber spans 932-933 may also comprise any other type of fiber have a zero-dispersion wavelength or near zero-dispersion wavelength around 850 nm.

When in operation, TDF span 911 receives and transports optical signals in the 850 nm window. As TDF span 911 transports the optical signals, laser diode 921 pumps TDF span 911 through coupler 924 at a wavelength of 1400 nm. The pumping may comprise forward or backward pumping. The pumping by laser diode 921 generates gain in the optical signals in the 850 nm window.

The amplifier systems discussed above advantageously amplify signals in the 850 nm window, which allows the 850 nm window to be used for applications other than just short reach applications. The 850 nm window can thus be effectively opened up for other types of data communications, such as long haul communications. Because there are cost effective 850 nm lasers, the 850 nm window can advantageously be used to provide lower cost alternative to the 1310 nm and 1550 nm windows. The amplifier systems also advantageously allow for higher bit rate communications, such as 1 GbE or 10 GbE.

What is claimed is:

1. An amplifier system, comprising:
   a span of Thulium-doped fiber (TDF) configured to transport optical signals in an 850 nm window;
   a first pump system configured to pump the TDF span at a wavelength in the range of 1390 nm to 1430 nm; and
   a second pump system configured to pump the TDF span at a wavelength in the range of 670 nm to 720 nm;
   wherein the pumping by the first pump system and the second pump system is configured to generate gain in the optical signals in the 850 nm window.

2. The amplifier system of claim 1 wherein the pumping by the first pump system and the second pump system is configured to generate at least a 10 dB gain in the 850 nm window.

3. The amplifier system of claim 2 wherein the pumping by the first pump system and the second pump system is configured to generate the at least 10 dB gain over a 40 nm gain bandwidth.

4. The amplifier system of claim 1 wherein the first pump system and the second pump system are configured to both forward pump the TDF span, to both backward pump the TDF span, or to have one backward pump the TDF span while the other forward pumps the TDF span.

5. The amplifier system of claim 1 wherein the first pump system is set to a first power and the second pump system is set to a second power, and a power ratio between the first power and the second power is in the range of 1:1 to 5:1.

6. The amplifier system of claim 1 wherein the concentration of Thulium in the TDF span is between 2000 ppm and 6000 ppm.

7. A method of operating an amplifier system, wherein the amplifier system includes a span of Thulium-doped fiber (TDF), a first pump system, and a second pump system, the method comprising:

receiving optical signals in the TDF span in an 850 nm window;
pumping the TDF span at a wavelength in the range of 1390 nm to 1430 nm using the first pump system;
pumping the TDF span at a wavelength in the range of 670 nm to 720 nm using the second pump system; and
generating gain in the optical signals in the 850 nm window.

8. The method of claim 7 wherein generating gain comprises generating at least a 10 dB gain in the 850 nm window.

9. The method of claim 8 wherein generating gain comprises generating the at least 10 dB gain over a 40 nm gain bandwidth.

10. The method of claim 7 wherein the pumping of the TDF span by the first pump system and the second pump system comprises:
forward pumping the TDF span with both the first pump system and the second pump system;
backward pumping the TDF span with both the first pump system and the second pump system; or
backward pumping the TDF span with one of the first pump system and the second pump system while forward pumping the TDF span with the other one of the first pump system and the second pump system.

11. The method of claim 7 wherein the first pump system is set to a first power and the second pump system is set to a second power, and the method further comprises:
setting a power ratio between the first power and the second power in the range of 1:1 to 5:1.

12. The method of claim 7 wherein the concentration of Thulium in the TDF span is between 2000 ppm and 6000 ppm.

13. An amplifier system, comprising:
a span of Thulium-doped fiber (TDF) configured to transport optical signals in an 850 nm window; and
a pump system configured to pump the TDF span at a wavelength in the range of 1390 nm to 1430 nm;
wherein the pumping by the pump system is configured to generate gain in the optical signals in the 850 nm window.

14. The amplifier system of claim 13 wherein the pumping by the pump system is configured to generate at least a 10 dB gain in the 850 nm window.

15. The amplifier system of claim 13 wherein the pump system is configured to forward pump or backward pump the TDF span.

16. The amplifier system of claim 13 wherein the concentration of Thulium in the TDF span is between 2000 ppm and 6000 ppm.

17. A method of operating an amplifier system, wherein the amplifier system includes a span of Thulium-doped fiber (TDF) and a pump system, the method comprising:
receiving optical signals in the TDF span in an 850 nm window;
pumping the TDF span at a wavelength in the range of 1390 nm to 1430 nm using the pump system; and
generating gain in the optical signals in the 850 nm window.

18. The method of claim 17 wherein generating gain comprises generating at least a 10 dB gain in the 850 nm window.

19. The method of claim 17 wherein the pumping of the TDF span by the pump system comprises:
forward pumping the TDF span with the pump system; or
backward pumping the TDF span with the pump system.

20. The method of claim 17 wherein the concentration of Thulium in the TDF span is between 2000 ppm and 6000 ppm.

\* \* \* \* \*